United States Patent [19]

Magni et al.

[11] Patent Number: 4,824,885

[45] Date of Patent: Apr. 25, 1989

[54] PROCESS OF (CO) POLYMERIZATION OF ALPHA-OLEFINS IN THE PRESENCE OF ANTIOXIDANTS

[75] Inventors: Ambrogio Magni, Robbiate; Erik Bersanetti, Milan, both of Italy

[73] Assignee: Enichem Sintesi S.p.A., Palermo, Italy

[21] Appl. No.: 70,179

[22] Filed: Jul. 6, 1987

[30] Foreign Application Priority Data

Jul. 23, 1986 [IT] Italy ................................. 2122A/86

[51] Int. Cl.$^4$ ........................... C08K 5/52; C08K 5/53
[52] U.S. Cl. .................... 524/120; 524/117; 524/121; 524/126; 524/128; 524/133; 524/135; 524/147; 524/151; 524/153; 526/139; 526/193
[58] Field of Search ............... 524/126, 128, 117, 120, 524/121, 133, 135, 151, 147, 153; 526/81, 84, 139, 193

[56] References Cited

U.S. PATENT DOCUMENTS

| | | | |
|---|---|---|---|
| 2,847,443 | 8/1958 | Heckenbleikner et al. | 524/117 |
| 2,973,348 | 2/1961 | Coover et al. | 526/139 |
| 3,264,277 | 8/1966 | Winkler et al. | 526/139 |
| 3,558,586 | 1/1971 | Fodor | 526/139 |
| 3,632,690 | 1/1972 | Dever et al. | 524/117 |
| 3,903,208 | 9/1975 | Hofer | 524/135 |
| 4,233,207 | 11/1980 | Spivack | 524/135 |
| 4,386,011 | 5/1983 | Fodor | 526/139 |
| 4,495,320 | 1/1985 | Chasar | 524/117 |

FOREIGN PATENT DOCUMENTS

59-16431  9/1984  Japan.
59-164307 9/1984  Japan.

OTHER PUBLICATIONS

Williams, J. L. et al–J. Applied Polymer Science, vol. 27, 951–955 (1982).
Henman, T. J.–Developments in Polymer Stabilization–1, 39 to 100 (1979).
Encyclopedia of Polymer Sci. and Eng.–vol. 6, p. 441.
Kirk–Othmer Encyclopedia of Chem. Tech. Third Ed. vol. 16, pp. 424–427, 440,441,446 and 447.
Polyolefin Plastics–ed. Theordore Kresser (1970) pp. 72,73,78 to 81.
CA 102 (1985) 46425 v; 46426 w; 46427 x; 46428 y.

*Primary Examiner*—Veronica P. Hoke
*Attorney, Agent, or Firm*—Stevens, Davis, Miller & Mosher

[57] ABSTRACT

Stabilizers for organic polymers, consisting of one or more phosphorus-containing compounds of the family of alkyl- and/or phenyl-phosphites, alkyl- and/or phenyl-phosphonites, alkyl- and/or phenyl-diphosphonites, are directly added to the reaction mixture during the (co)polymerization of α-olefins or of mixtures thereof with other unsaturated monomers.

The so-obtained polymeric compositions result perfectly stabilized, and show a thermo-oxidative resistance higher than that of the same polymeric compositions to which the same antioxidants have been added by a traditional route.

11 Claims, 3 Drawing Sheets

PROCESS OF (CO) POLYMERIZATION OF ALPHA-OLEFINS IN THE PRESENCE OF ANTIOXIDANTS

The present invention relates to a new process for the homo- or copolymerization of α-olefins, wherein stabilizer compounds, belonging to the family of organic phosphites, diphosphites, phosphonites and diphosphonites are directly added to the reaction mixture during the course of the polymerization.

It is known that the organic polymers, such as, e.g., the polyolefins, undergo degradation with time, due to the exposure to the atmospheric agents, and, in particular, to the U.V. light, as well as thermo-oxidative degradations during the processing and transformation processes.

This degradation appears as a decrease in the physical characteristics of the polymers, such as, e.g., a decrease in ultimate tensile strength and a decrease in flexibility, which are accompanied by a change in melt flow index, or in melt flow time of the same polymers.

For the purpose of counteracting such a degradation, it is customary in the art to introduce into the organic polymers small amounts of antioxidant compounds, generally constituted by sterically hindered phenols, benzotriazoles, pyrrolidine derivatives, as well as phosphorus-containing compounds, such as, e.g., those belonging to the family of organic phosphites and phosphonites, and their various mixtures.

The difficulties which are met in the stabilization of the organic polymers derive essentially from phenomena of release of the stabilizer by the polymer.

These phenomena occur always, to a greater or lesser extent, when the traditional stabilizing compounds are used, but, above all, they can be boosted by the modalities according to which the same antioxidants are added to the polymer.

Typical is the case of the suspension-produced polyolefins (polypropylene, polyethylene), wherein the stabilizer compound is added to the polymer at the end of the polymerization reaction, and before the extrusion and pelletizing steps.

In these cases, the stabilizer product is distributed on the outer surface of polymer particles. A better homogenization is generally obtained in these cases during the subsequent thermal treatments, such as, e.g., the extrusion in the molten state, or the processing by the manufacturer of finished or semi-finished articles, for producing such articles.

These thermal treatments are generally extremely detrimental for not-completely stabilized polymers, such as those obtained from the above-mentioned polymeric suspensions, and that, above all in cases of propylene, whose instability to the thermal treatments is well-known.

Extremely dramatic is the case of polyolefins, in particular polypropylene, obtained with organo-metallic catalytic systems capable of supplying polymers in the form of granules or pellets, or anyway of particles having rather large dimensions, and which, should it be possible to adequately stabilize them, could be sold avoiding the steps of extrusion and pelletizing.

One should furthermore keep in his mind that the operations of milling, blending and re-compounding (extrusion and pelletizing) are generally very expensive, besides being detrimental for the properties of the polymers according to what previously said.

The present Applicant has now surprisingly found that the above problems can be overcome by using, as stabilizer agents, the phosphorus-containing antioxidants belonging to the class of phosphites and phosphonites, and adding these compounds during the step of polymerization. In fact, these antioxidant agents have shown to be chemically inert towards the catalytic systems generally used in the synthesis of the polyolefins, and can be hence directly added to the polymerization reactor.

By operating in the above shown way, an absorption of the antioxidant by the growing polymer granule is obtained, with said antioxidant being incorporated in a homogeneous and uniform way inside the particles of the produced polymer.

The advantages achieved by means of the new process wherein the antioxidant is added to the polymer during the step of polymerization are many: first of all, as it shall be exhaustively shown in the experimental part, that of forming polymers which are considerably more stable than those to which the same amounts of the same antioxidants are added a posteriori, or by any other systems.

Significant financial advantages which can be accomplished by means of the new method derive from the possible elimination of expensive equipment, such as the equipment for extrusion, milling and blending with the antioxidant powder, and no longer necessary due to such reasons as previously stated.

In front of the above, no contraindications to the use of the method claimed in the present patent application have been found.

In fact, the antioxidants used do not interfere with the catalyst, and do not modify the main characteristics of the polymers, such as, e.g., the molecular weights, their distribution, the viscosity, the melting points, etc.

The phosphorus-containing antioxidants used in the process according to the present invention are furthermore compatible with most commercial antioxidants, which, if desired, can be hence later on added, to the end polymer.

In some cases, the further addition of an antioxidant of another type, e.g., of phenolic type, further increases the stability of the polymers, thanks to an advantageous synergistic effect which has been evidenced many times (see, e.g., U.K. patent No. 1,978,772, and U.S. Pat. No. 3,533,989).

The phosphorus-containing antioxidants disclosed in the present patent application are furthermore perfectly colourless, and do not cause, in the polymers to which they are added, any phenomena of colour shade change, or the appearance of discolorations on the surfaces of the articles which are manufactured from them.

Therefore, the object of the present patent application is a process of polymerization of α-olefins, in particular ethylene and propylene, or mixtures thereof with other unsaturated monomers, wherein the antioxidant, which is constituted by one or more phosphorus compound(s) belonging to the families of organic phosphites and phosphonites, is directly added to the reaction mixture during the same polymerization.

The phosphorus-containing compounds which can be added according to the process of the present invention are:

(a) the aryl-phosphites and the alkyl-aryl-phosphites having the general formula (I)

(I)

wherein:
both n and m can be, independently from each other, 0, 1, 2 or 3, with the proviso that their sum equals 3, $R_1$, $R_2$ and $R_3$ can be, independently from one another, a hydrogen atom, a straight- or branched-chain alkyl radical containing from 1 to 20 carbon atoms, a cycloalkyl radical containing from 5 to 12 carbon atoms, a phenyl or phenyl-($C_1$–$C_4$)-alkyl radical, wherein the phenyl radical can be possibly phenyl-substituted, and $R_4$ is a straight- or branched-chain alkyl radical containing from 1 to 20 carbon atoms, and (II):

(II)

wherein:
$R_1$, $R_2$ and $R_3$ have the above seen meaning;

(b) the diphosphonites derived from pentaerythritol, having the general formula (III)

(III)

wherein:
$R_5$ is a straight- or branched-chain alkyl radical containing from 1 to 20 carbon atoms, or a possibly mono- or poly-alkyl-substituted phenyl radical; and (c) the phosphonites and diphosphonites having the general formula wherein:
$R_6$, $R_7$ and $R_8$ represent, independently from one another, a straight- or branched-chain alkyl radical containing from 1 to 20 carbon atoms, of a possibly mono- or poly-alkyl-substituted phenyl radical.

The above shown compounds, having the formulae from (I) to (V) can be synthesized according to the conventional methods, well-known to any chemist skilled in the field of the organic syntheses. For a general indication of the synthesis methods, reference is to be made, e.g., to D. Barton and W. D. Ollis, Comprehensive Organic Chemistry, Volume 2, Chapter 10.3 (1979) and to the therein cited references.

More particularly, however, a conventional method for preparing the compounds belonging to the (a) group provides the reaction of phosphorus trichloride or phosphorus tribromide with the corresponding alcohols or phenols, in the presence of a nitrogenous organic base, which performs the function of acceptor of the hydrogen halide which develops during the reaction, or, in case of asymmetrical phosphites, the exchange between a symmetrical tri-ester and the suitable alcohol or phenol, preferably in the presence of traces of basic catalysts (the corresponding alkoxides or phenates) or acids.

For exemplifying purposes, among the compounds belonging to the (a) group, which are well usable in the process of the present invention, there are the following compounds:
tris(2,4-di-butyl-5-methylphenyl)phosphite;
tris(4-nonylphenyl)phosphite;
tris(4-tert.butylphenyl)phosphite;
tris(2,5-di-tert.butylphenyl)phosphite;
tris(2-tert.butylphenyl)phosphite;
tris(2-biphenylyl)phosphite;
tris(2-cyclohexylphenyl)phosphite;
tris(2-nonylphenyl)phosphite;
tris(2-tert.butyl-4-methylphenyl)phosphite;
tris(2,4-di-tert.butylphenyl)phosphite;
triphenyl phosphite;
tris(2,4-bis(alphamethylbenzyl)phenyl)phosphite;
trioctylphosphite;
tridecylphosphite;
trilaurylphosphite;
tristearylphosphite;
diphenyl-octylphosphite;
diphenyl-isodecylphosphite;
tris(2,4-di-nonylphenyl)phosphite;
catechyl-(2,6-di-tert.butyl-4-methylphenyl)phosphite;
catechyl-(2,4,6-tri-tert.butylphenyl)phosphite;
catechyl-α-naphthylphosphite.

Also the diphosphites having formula (III) can be conveniently prepared by starting from $PCl_3$ or $PBr_3$, using pentaerythritol (2,2-bis(hydroxymethyl)-1,3-propanediol) as one of the two hydroxy compounds used as the starting compounds. Among the compounds belonging to this group, which can be used in the process according to the invention, there are, e.g., those disclosed in the published Japanese patent applications (Kokai) Nos. 54/25951 (CA 91 58126r) and 59/80452 (CA 101 172390x) and in the French patent application No. 2 491 482.

Non-limitative examples of such compounds are:
distearyl pentaerythrityldiphosphite;
diisodecyl pentaerythrityldiphosphite;
di-(tert.octyl)pentaerythrityldiphosphite; and
bis(2,4-di-tert.butylphenyl)pentaerythrityldiphosphite.

As relates to the phosphonites and diphosphonites belonging to the (c) group, the first ones can be conveniently synthesized by starting from a di-chloroalkyl- or di-chloroaryl-phosphine with the suitable alcohols and phenols, whilst the second ones are easily obtained by means of the the Friedel-Crafts reaction of $PCl_3$ on biphenyl, and subsequent reaction of the so-obtained intermediate with the corresponding hydroxy-compounds. Among the compounds belonging to this group, bis(2,4-di-tert.butylphenyl)diphenylphosphonite can be mentioned for exemplifying purposes.

Many of the compounds hereinabove listed for exemplifying purposes are commercial products, and are hence easily available from the market.

The olefinic monomers which can be polymerized or copolymerized according to the process of the present invention, in the presence of an antioxidant, are, e.g., ethylene, propylene, 1-butene, 4-methyl-1-pentene, 2-methyl-1-pentene, 1-pentene, 3-methyl-1-butene, 1-hexene, 1-octene, 2-ethyl-1-hexene, styrene, and so forth.

The stabilized polyolefins which are within the scope of the claims of the present invention are hence all those polyolefins which derive from the polymerization and copolymerization according to the process of the present invention of the above-indicated monomers, as well as the products obtained from the mechanical blending of such polyolefins.

The process of polymerization of the α-olefins in the presence of an antioxidant according to the present invention can be carried out according to any of the most commonly used polymerization procedures, i.e., as a dispersion in an inert solvent, or as a dispersion in the same monomer, which, under the saturation pressure, is liquid.

When, according to the most convenient method from an industrial viewpoint, the polymerization is carried out in the presence on an inert solvent, this shall be suitably selected from the aliphatic hydrocarbons, such as n-hexane, n-pentane, h-heptane, n-octane, iso-pentane, and so forth, the cyclic hydrocarbons, such as cyclohexane or cyclooctane, and the aromatic hydrocarbons, such as benzene or toluene.

The temperature and pressure conditions, under which the polymerization is to be carried out in the presence of the antioxidant, are those usable in the conventional polymerizations. For example, the polymerization in the presence of an inert solvent can be advantageously carried out at a temperature comprised within the range of from 0° to 120° C., preferably of from 20° to 100° C., and under pressures comprised within the range of from the atmospheric value to 15 atmospheres, and preferably of from 1 to 10 atmospheres. If desired, molecular weight control agents can be used, as well-known in this field.

As relates to the catalysts usable in the process of the invention, these are the catalysts normally used in the synthesis of the polyolefins, and, in particular, the catalysts constituted by a compound of a transition metal of one of Groups IVA-VIII of the Periodic Table, e.g., titanium, vanadium, chrome, zirconium, together with an organic compound of a metal of one of Groups I–III (Catalysts of Ziegler-Natta type) and the catalysts on the basis of metal oxides.

The classic example of a Ziegler-Natta catalytic system, which is also the most commonly used catalytic system in the polymerization of the olefins, is constituted by an organic compound of aluminum, e.g., triethyl-aluminum, tri-isobutyl-aluminum, di-ethyl-aluminum chloride, isobutyl-aluminum dichloride, and so forth, and by titanium chlorides; in the preferred form catalysts are used, in which the titanium chloride is reacted with a magnesium compound (magnesium oxide, hydroxide, chloride, alkoxides, or carboxylates), and, if desired, in the presence of an electron donor; this is then combined with an organic aluminum compound, as above.

As relates, on the contrary, to the catalysts based on metal oxides, the most used are the oxides of vanadium, molibdenum and tungsten, supported on alumina, or another inert oxide, activated by reduction with hydrogen, and chrome oxide on silica-alumina, activated by oxidation in air at high temperatures. However, from the patent literature, as well as from the general technical literature, other types of catalytc systems for the high-yield polymerization of olefins are known, and all of them ca be used in the process of the invention as well.

The addition of the antioxidant compound to the reaction mixture can be carried out also after that the true polymerization step has begun, or before its beginning, by mixing one or more of the compounds belonging to the above (a), (b) and (c) groups, with the catalytic system, and then adding it to the reaction mixture together with this latter.

The amounts of antioxidant which are added to the reaction mixture are strictly depending on the polymer yields, on the polymer amount in the suspension or solution which leaves the reactor, and on the amount of antioxidant desired in the same polymer. The desired amount of antioxidant in the produced polyolefins is generally comprised within the range of from 0.005 to 1% by weight, and preferably of from 0.01 to 0.1%.

The amount of antioxidant to be used in the process of the invention in order to obtain a polymer containing the desired percentage of antioxidant, can be easily computed for each polymerization, if the percentage of solvent contained in the wet polymer outcoming from said polymerization is known, and then suitably adjusting the antioxidant concentration in the reaction dispersant.

The following examples further illustrate the process of the present invention, but they should not be unerstood as being limitative of the scope of said invention.

The extrusion tests on the polymers reported in the examples were carried out after previously blending the polymer powders with the various antioxidants on a mixer and for a blending time of 30 minutes. Obviously, the operation of blending with antioxidants was not carried out on the polymers obtained from syntheses carried out in the presence of antioxidants, and to which further additives were not added.

The polymer powders are then extruded by means of a BRABENDER EXTRUDER under the following conditions:

D = screw diameter = 19 mm;
L = screw length = 25.D;
temperatore profile along the screw = 200°, 220°, 240°, 260° C.

The melt flow index (MFI) measurements were carried out after the 1st, 3rd, 5th and 7th extrusion on a CEAST equipment at 190° C. and under 2.16 kg, according to ASTM D 1238 (Condition L).

The changes in MFI as a function of the extrusion number n are reported as ΔMFI%, wherein:

$$\Delta MFI\% = \frac{MFI_n - MFI_1}{MFI_1} \times 100$$

Decreasing ΔMFI% values indicate a viscosity increase, due to the crosslinking of the polymer, whilst increasing values indicate a decrease in viscosity, with polymers degradation (breakdown into fragments).

The drawings are graphs of the results obtained when polymerization takes place under varying conditions.

In any case, the smaller the slope of the curve of $\Delta MFI\%$ as a function, of the extrusion number on the Brabender extruder, the more stable the polymer.

EXAMPLE 1

Polymerization in the Presence of a Phosphorus Containing Antioxidant

To an autoclave of 5 liters of capacity, free from air and moisture, equipped with a magnetic anchor stirrer, 2 liters of anhydrous and de-aerated heptane, 8 mmol of aluminum-tri-isobutyl and 1,750 mg of the phosphorus-containing antioxidant additive SANDOSTAB PEPQ by SANDOZ (bis-(2,4-di-tert.butylphenyl)diphenyl-phosphonite) are charged.

The temperature is increased to 85° C., then 2 bars of $H_2$, 50 ml of a heptanic suspension containing 12 mg of a Ziegler-Natta catalyst for the polymerization of α-olefins, formed by reacting $TiCl_4$ with the product of the spray-drying of an ethanolic solution of $MgCl_2$—as disclosed in U.S. Pat. No. 4,377,491—and ethylene are added, in the order mentioned, until the total pressure of 6 bars is reached.

The feed of ethylene to the autoclave is continued for 2 hours, with pressure and temperature being kept constant.

At the end of the polymerization, 10 g of ethyl alcohol is added, then the reaction mixture is cooled at room temperature and autoclave is vented. The polymeric suspension is then discharged and filtered, 275 g of a solvent-wet polymer being obtained, which is dried in an oven at 70° C. and under 10 $mm_{Hg}$ for 2 hours.

192 g is obtained of solvent-free polymer, containing approximately 0.05% of antioxidant, and having the following characteristics:

MFI = 1.6 g/10 minutes;

Shear sensitivity ($MFI_{21.6}/MFI_{2.16}$) = 35.

Figure 1:
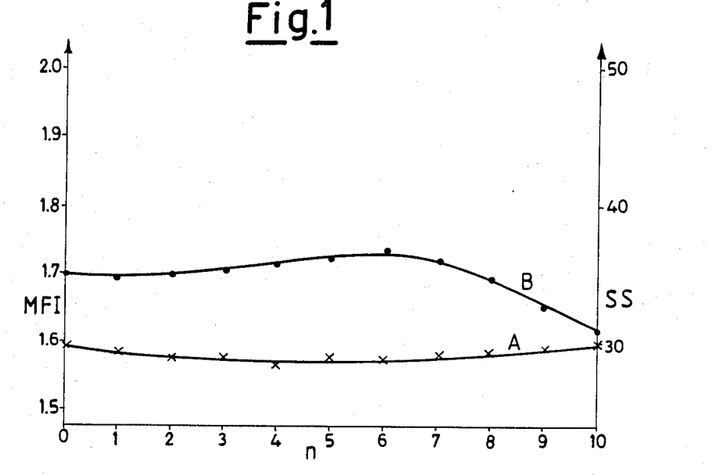
FIG. 1 shows the variations of the Melt Flow Index and the Shear Sensitivity under the conditions of Example 1, plotted against the number (n) of passes through a Brabender extruder.

The changes in MFI and shear sensitivity as a function of the number of the passages through the Brabender are plotted in FIG. 1.

The so-obtained polymer, containing only the phosphorus-containing antioxidant added during the synthesis, results perfectly stabilized throughout the whole test range.

EXAMPLE 2

Polymerization in the Absence of Phosphorus-Containing Antioxidant

The polymerization is carried out as disclosed in Example No. 1, but without introducing the phosphorus-containing antioxidant.

At the end of the polymerization, 10 g is added of ethyl alcohol, the reaction mixture is cooled to room temperature, and the autoclave is vented. The polymeric suspension is discharged and is filtered; 297 g of solvent-wet polymer is obtained, which is dried in oven at 70° C. and under 10 $mm_{Hg}$ for 2 hours.

201 g is obtained of a solvent-free polymer, having the following characteristics:

$MFI_{2.16}$ = 1.32 g/10 minutes;

Shear sensitivity = 32.

Figure 2:
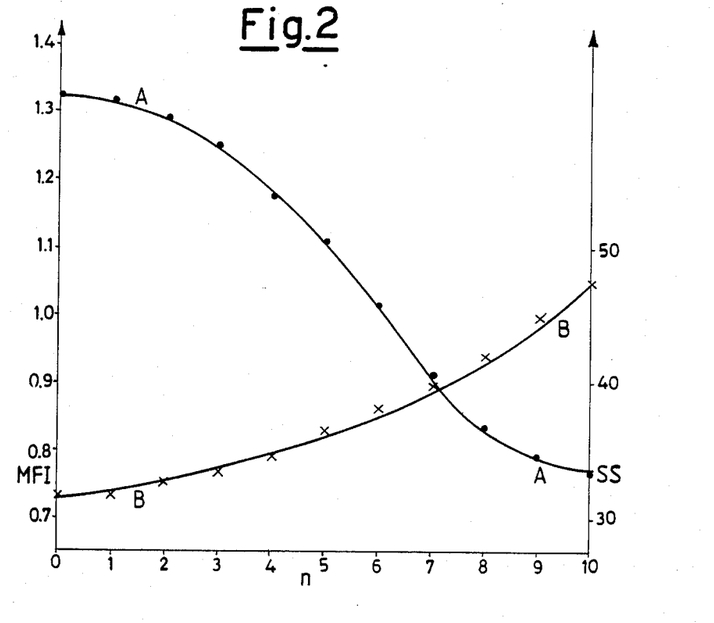
FIG. 2 shows the variations of the Melt Flow Index and the Shear Sensitivity under the conditions of Example 2.

The changes in MFI and shear sensitivity as a function of the number of the passages through the Brabender are plotted in FIG. 2.

The polymer not containing the antioxidant is not stable to the treatments it underwent.

The comparison between the results obtained with the polymer of the first Example and with that of the second Example indicates that, with the operative conditions being the same, the same amounts are obtained of polymer having the same shear sensitivity and the same shear stress; that demonstrates that the addition of the phosphorus-containing antioxidant during the synthesis has no influence both on yields and molecular weight, and on molecular weight distribution.

The comparison of the thermo-oxidative stability of the two polymers (see FIG. 1 and FIG. 2) shows, on the contrary, the validity of the addition of the diphosphonite phosphorus-containing antioxidant during the synthesis of the polymers.

EXAMPLE 3

The polymer was produced by means of the same procedure, and under the same operating conditions as of Example 1, with the only exception of the amount of commerical phosphorus-containing antioxidant (SANDOSTAB PEPQ by SANDOZ), which was doubled.

195 g is obtained of a dry polymer, having the following characteristics:

MFI = 1.2;

Shear sensitivity = 30.

Figure 3:
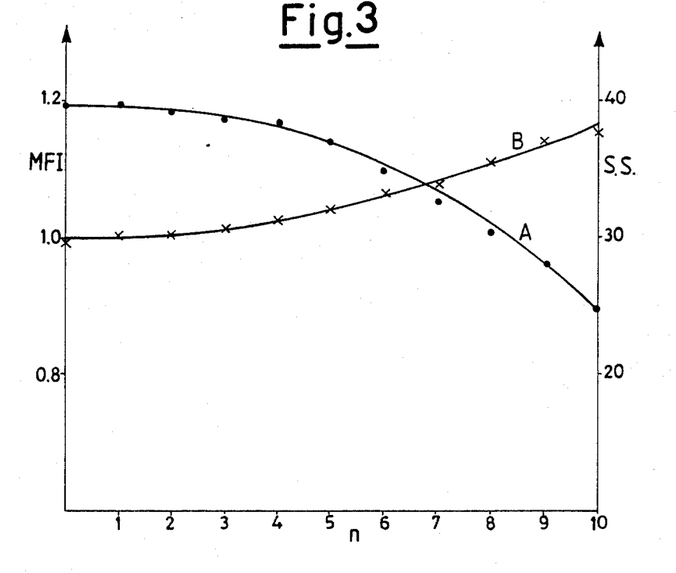
FIG. 3 shows the variations of the Melt Flow Index and the Shear Sensitivity under the conditions of Example 3.

The changes in MFI and shear sensitivity as a function of the number of the passages through the Brabender are plotted in FIG. 3.

The sample shows thermo-oxidative stability up to the 6th passage; its thermo-oxidative stability decreases then by approximately 24% during the last 4 passages. Such stability is regarded as good for normal extrusion processing.

EXAMPLE 4

Polymerization With the end Addition of Phenolic Antioxidant to the Polymeric Suspension To an autocalve of 5 liters of capacity, free from air and moisture, equipped with a magnetic-anchor stirrer, 2 liters of anhydrous and de-aerated heptane and 4 mmol of aluminum-triethyl is added.

The temperature is increased to 91° C., then 4 bars of $H_2$, 50 ml of a heptanic suspension containing 35 mg of a catalyst for the polymerization of α-olefins, as of Example 1, and ethylene are added, in the order mentioned, until the total pressure of 10 bars is reached.

The feed of ethylene to the autoclave is continued for 4 hours, with pressure and temperature being kept constant.

At the end of the polymerization, 20 ml of ethyl alcohol and 400 mg of phenolic antioxidant 2,6-di-tert.-butyl-p-cresol (IONOL) are added, and the reaction mixture is then cooled to room temperature and autoclave is vented. The polymeric suspension is then discharged and filtered; 586 g of solvent-wet polymer is obtained, which is dried in an oven at 70° C. and under 1 mm$_{Hg}$ for 2 hours.

420 g is obtained of solvent-free polymer, having the following characteristics:
MFI$_{2.16}$=7.18;
Shear sensitivity=31.

In Table 1, the values of MFI$_{2.16}$ after the various passages through the Brabender are shown.

Figure 4:
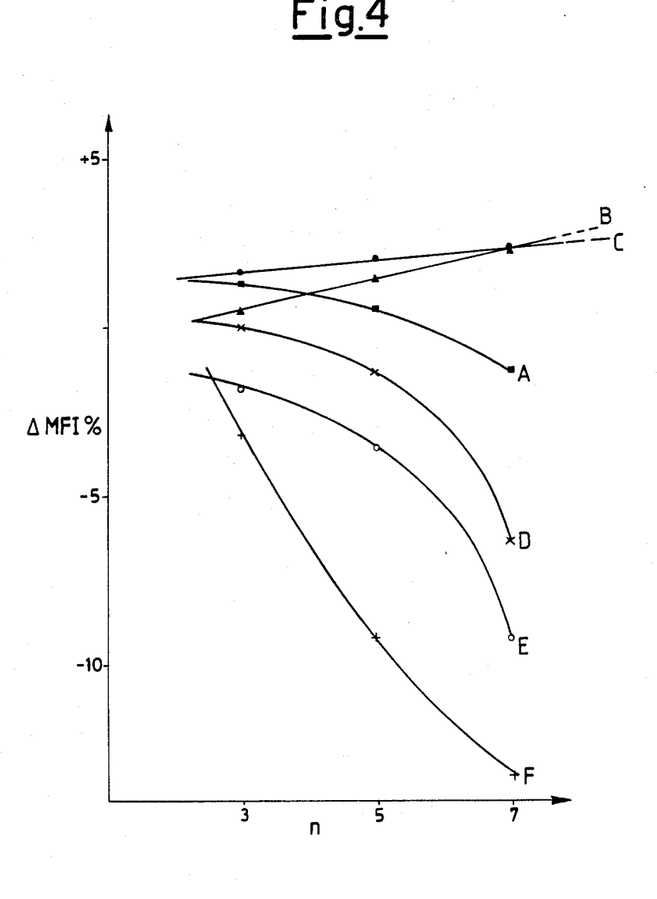
FIG. 4 shows the variations of the Melt Flow Index, in terms of Delta-MFI% under the conditions of Examples 4, 5, 6, 7, 8 and 9.

The changes in MFI, reported as ΔMFI%, are reported in FIG. 4 (Curve A). The polymer results sufficiently stabilized.

EXAMPLE 5

Polymerization With the Addition, at the 30th minute, of a Phosphorus Containing Antioxidant By following the same procedure, and under the same operating conditions as disclosed in Example 4, and with the only variant that at the 30th minute of polymerization, 2 g is added of Alkanox 240 antioxidant by Bozzetto ((tris(2,4-di-tert.butylphenyl)phosphite)), and without adding the phenolic antioxidant at the end of the polymerization, 415 g was produced of a dry polymer (wet polymer=580 g), containing 0.05% of antioxidant, having the following characteristics:
MFI$_{2.16}$=6.09;
Shear sensitivity=32.

The values of MFI$_{2.16}$ after the various passages through the Brabender are reported in Table 1, whilst the corresponding values of ΔMFI% are ploted in FIG. 4 (Curve B).

EXAMPLE 6

Polymerization With the Addition, at the 30th minute, of a Phosphorus Containing Anitoxidant, and End Addition of Phenolic Antioxidant The polymerization is carried out as disclosed in Example 4, with the only variant that at the 30th minute of polymerization, 2 g of Alkanox 240 antioxidant is added to the reaction mixture inside the autoclave.

357 g is produced of a dry polymer (solvent-wet polymer=567 g), having the following characteristics:
MFI$_{2.16}$=7.35;
Shear sensitivity=29.

The values of MFI$_{2.16}$ after various extrusions through the Brabender are reported in Table 1, whilst the corresponding values of ΔMFI% are plotted in FIG. 4 (Curve C).

EXAMPLE 7

Polymerization Without the Addition of Additives, and Addition of Phosphite to the Polymer During the Processing on the Brabender The polymerization is carried out as by following the same procedure, and under the same conditions as disclosed in Example 4, with the only variant that no antioxidant suspension is added.

402 g was obtained of a dry polymer (wet polymer=588 g), which was charged to the Brabender with 160 mg of antioxidant.

The characteristics of the thus obtained polymer are the following:
MFI$_{2.16}$=6.58;
Shear sensitivity=31.

The behaviours of MFI$_{2.16}$ and ΔMFI% are respectively reported in Table 1, and plotted in FIG. 4 (Curve D).

EXAMPLE 8

Polymerization With the Addition of Phenolic Antioxidant (IONOL) to the Suspension, and Addition of Phosphite to the Polymer During the Processing on the Brabender The polymerization is carried out as disclosed in Example 4, with at the end of the polymerization the phenolic antioxidant (IONOL) being added.

398 g is obtained of a dry polymer (wet polymer=562 g), to which in the Brabender 160 mg of a commercial phosphorus-containing antioxidant (phosphite, Alkanox 240) is added.

The end characteristics of the polymer are the following:
MFI$_{2.16}$=6.72;
Shear sensitivity=32.

The behaviours of MFI$_{2.16}$ and ΔMFI% as a function of the number of extrusions on the Brabender are respectively reported in Table 1, and plotted in FIG. 4 (Curve E).

EXAMPLE 9

Polymerization Without the Addition of Any Additives

Polymerization as disclosed in Example 4, without the addition of any antioxidants.

396 g is obtained of dry polymer (solvent-wet polymer=592 g), having the following characteristics:
MFI$_{2.16}$=6.63;
Shear sensitivity=31.

The values of MFI$_{2.16}$ and ΔMFI% after various extrusions on the Brabender are respectively reported in Table 1, and plotted in FIG. 4 (Curve F).

From the whole set of results obtained and reported in the above Examples, it results clear that the addition of a phosphite during the polymerization has a beneficial effect on the stability of the polymer.

The polymer stabilized during the polymerization results better than that stabilized with an equivalent amount of phosphite added after the polymerization (compare the results of Example 5 with those of Example 7, and Curve B with Curve D in FIG. 4).

The polymer obtained according to the conditions of Example No. 6 (Curve A of FIG. 4) resulted—as it was expected—the best one, because it exploits the synergistic effect resulting from the contemporaneous presence of the phosphorus-containing antioxidant added during the polymerization, and of the phenolic antioxidant added at the end of the polymerization.

TABLE 1

MFI$_{2.16}$ of Polyethylenes Produced Under the Same Experimental Conditions, but with Different Modalities of Addition of Antioxidants and After Various Extrusions on Brabender Extruder

| Type of Polymer | | MFI$_{2.16}$ After Extrusion No. | | | |
|---|---|---|---|---|---|
| | | 1 | 3 | 5 | 7 |
| Example 4 | End addition of phenolic stabilizer | 7.18 | 7.27 | 7.22 | 7.13 |

TABLE 1-continued

MFI$_{2.16}$ of Polyethylenes Produced Under the Same Experimental Conditions, but with Different Modalities of Addition of Antioxidants and After Various Extrusions on Brabender Extruder

| | Type of Polymer | MFI$_{2.16}$ After Extrusion No. | | | |
|---|---|---|---|---|---|
| | | 1 | 3 | 5 | 7 |
| Example 5 | Addition of phosphorus-containing antioxidant during the polymerization | 6.09 | 6.12 | 6.18 | 6.23 |
| Example 6 | As in Example 5, and with the addition of a phenolic antioxidant to the end polymer suspension | 7.35 | 7.47 | 7.50 | 7.53 |
| Example 7 | Polymerization without the addition of antioxidants, and with the addition of phosphorus-containing antioxidant during the processing on the Brabender | 6.58 | 6.58 | 6.50 | 6.16 |
| Example 8 | End addition of phenolic antioxidant, and addition of phosphorus-containing antioxidant during the processing on the Brabender | 6.72 | 6.60 | 6.48 | 6.12 |
| Example 9 | Virgin polymer | 6.63 | 6.44 | 6.02 | 5.75 |

EXAMPLE 10

Polymerization of Propylene in the Presence of a Phosphorus Containing Antioxidant To an autoclave of 5 liters of capacity, free from air and moisture, equipped with a magnetic anchor stirrer, kept at the temperature of 70° C., 2 liters of n-heptane containing 13 mmol of AlEt$_3$, 3.6 mmol of methyl p-toluate, 200 mg of the catalyst for the polymerization of α-olefins as disclosed in Example 1, and 2,500 mg of phosphorus-containing antioxidant additive (Alkanox 240 by Bozzetto) are charged; then, 500 ml of H$_2$ and propylene are charged, until the total pressure of 7 bars is obtained.

The feed of propylene to the autoclave is continued for 2 hours, with pressure and temperature being kept constant.

At the end of the polymerization, 10 g of ethyl alcohol is added, the reaction mixture is then cooled to room temperature and the autoclave is vented. The polymeric suspension is then discharged and filtered; 418 g of solvent-wet polymer is obtained. This polymer is dried in an oven at 70° C. and under 1.0 mm$_{Hg}$ for 2 hours.

Figure 5:
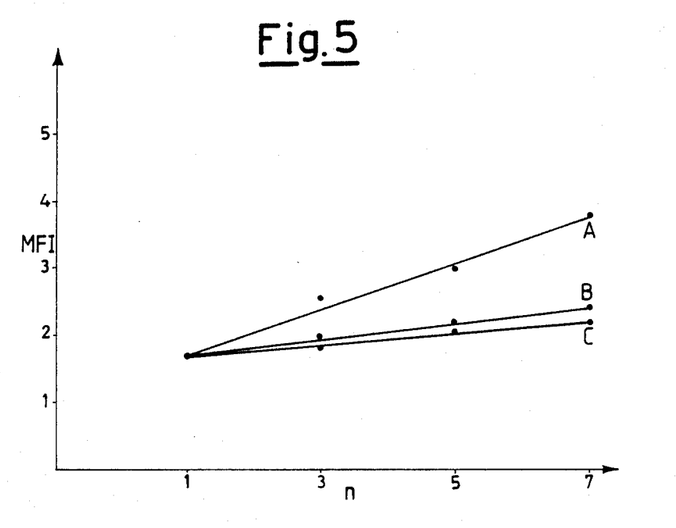
FIG. 5 shows the variations of the Melt Flow Index under the conditions of Examples 10, 11 and 12.

306 g is obtained of a solvent-free polymer, containing approximately 0.07% of antioxidant, and having:

MFI$_{2.16}$ = 1.68 g/10 minutes;

The MFI values after repeated extrusions are plotted in FIG. 5, Curve C.

EXAMPLE 11

Polymerization in the Absence of Phosphorus Containing Antioxidant

The polymerization is carried out as disclosed in Example No. 10, but without introducing the phosphorus-containing antioxidant.

At the end of the polymerization, 10 g of ethyl alcohol is added; the reaction mixture is cooled to room temperature, and the autoclave is vented.

The polymeric suspension is discharged and filtered. 394 g is obtained of a solvent-free wet polymer, which is oven-dried at 70° C. and under 10 mm$_{Hg}$ for 2 hours. 281 g is obtained of a solvent-free polymer, having:

MFI$_{2.16}$ = 1.71 g/10 minutes.

The values of MFI after repeated extrusions are plotted in FIG. 5 (Curve A).

EXAMPLE 12

Polymerization of Propylene in the Absence of Phosphorus Containing Antioxidant and With the Addition of Phosphite The polymerization is carried out as disclosed in Example No. 11.

423 g is obtained of wet polymer, which, when oven-dried at 70° C. and under 10 mm$_{Hg}$, yields 302 g of a dry polymer, to which—before the extrusion—151 mg is added of Alkanox 240 antioxidant.

MFI$_{2.16}$ = 1.69 g/10 minutes.

The values of MFI after repeated extrusions are plotted in FIG. 5 (Curve B).

In the following FIGS. 1-5, n indicates the extrusion number, MFI indicates the Melt Flow Index, and SS indicates the Shear Sensitivity.

In FIG. 4, the percent change in Melt Flow Index (expressed as ΔMFI%) is plotted as a function of the number of passages through the Brabender of the preparates disclosed in Example 4-9.

| Example No. | Corresponding Curve |
|---|---|
| 4 | A |
| 5 | B |
| 6 | C |
| 7 | D |
| 8 | E |
| 9 | F |

In FIG. 5, the change in MFI of the polymers disclosed in Examples 10-12 is plotted as a function of the number of passages through the Brabender.

| Example No. | Corresponding Curve |
|---|---|
| 10 | C |
| 11 | A |
| 12 | B |

The extrusion tests were carried out after a preliminary blending of the polymer powders disclosed in the Examples, with the various antioxidants, in a planetary mixer for a 1-hour time.

Obviously, such an operation was not carried out on the polymers obtained in the presence of antioxidants, and to which no further additives were added.

The polymer powders were extruded by using a Plasti Corder Brabender Model 651, equipped with a screw having a diameter D=19 mm, and a length L=25.D.

In case of polymers disclosed at Examples 1-9, the temperature profile along the screw was: 200°, 220°, 240°, 260° C. (at 100 rpm).

In case of polymers disclosed at Examples 10-12, the following temperatures were set:
165°, 180°, 195°, 195° C. (at 50 rpm) for the 1st extrusion; and
220°, 235°, 250°, 250° C. (at 50 rpm) for the subsequent extrusions.

MFI values were measured after the 1st, 3rd, 5th, 7th extrusions, on a CEAST instrument, according to ASTM D 1238 (Condition L).

We claim:

1. A process for preparing polymers or copolymers of thermostabilized α-olefins, comprising polymerizing an α-olefin monomer or copolymerizing α-olefin monomers in the presence of a catalyst of the Ziegler-Natta type or metal oxides and in the presence of at least an antioxidant selected from organic phosphites, diphosphites, phosphonites and diphosphonites in excess of the amount of catalyst to produce a polyolefin containing from 0.005 to 1% by weight of antioxidant.

2. The process according to claim 1, wherein the antioxidant agent has added to it a catalytic system before the beginning of the polymerization.

3. The process according to claim 1, wherein the antioxidant agent is added to the reaction mixture during the polymerization.

4. The process according to claim 1, wherein the catalyst is a Ziegler-Natta catalyst.

5. The process according to claim 1, wherein the olefinic monomer which is polymerized or copolymerized is selected from ethylene, propylene, 1-butene, 4-methyl-1-pentene, 2-methyl-pentene, 1-pentene, 3-methyl-1-butene, 1-hexene, 1-octene, 2-ethyl-1-hexene, and styrene.

6. The process according to claim 5, wherein the monomer is selected from ethylene and propylene.

7. The process according to claim 1, wherein the polymerization is carried out in the presence of an inert solvent.

8. The process according to claim 1, wherein such percentage is comprised within the range of from 0.01 to 0.1.

9. The process according to claim 1, wherein the antioxidant agent is selected from the following compounds:
tris(2,4-di-butyl-5-methylphenyl)phosphite;
tris(4-nonylphenyl)phosphite;
tris(4-tert.butylphenyl)phosphite;
tris(2,5-di-tert.butylphenyl)phosphite;
tris(2-tert.butylphenyl)phosphite;
tris(2-biphenylyl)phosphite;
tris(2-cyclohexylphenyl)phosphite;
tris(2-nonylphenyl)phosphite;
tris(2-tert.butyl-4-methylphenyl)phosphite;
tris(2,4-di-tert.butylphenyl)phosphite;
triphenyl phosphite;
tris(2,4-bis(alphamethylbenzyl)phenyl)phosphite;
trioctylphosphite;
tridecylphosphite;
trilaurylphosphite;
tristearylphosphite;
diphenyl-octylphosphite;
diphenyl-isodecylphosphite;
tris(2,4-di-nonylphenyl)phosphite;
catechyl-(2,6-di-tert.butyl-4-methylphenyl)phosphite;
catechyl-(2,4,6-tri-tert.butylphenyl)phosphite;
catechyl-α-naphthylphosphite.

10. The process according to claim 1, wherein the antioxidant agent is selected from:
(a) aryl-phosphites and alkyl-aryl-phosphites having the general formula (I)

wherein:
both n and m can be, independently from each other, 0, 1, 2 or 3, with the proviso that their sum equals 3,
$R_1$, $R_2$ and $R_3$ can be, independently from one another, a hydrogen atom, a straight- or branched-chain alkyl radical containing from 1 to 20 carbon atoms, a cycloalkyl radical containing from 5 to 12 carbon atoms, a phenyl, alkyl phenyl or phenyl alkyl radical wherein the alkyl radical contains from 1 to 4 carbon atoms, and
$R_4$ is a straight- or branched-chain alkyl radical containing from 1 to 20 carbon atoms, and (II):

wherein:
$R_1$, $R_2$ and $R_3$ have the above same meaning;
(b) diphosphites derived from pentaerythritol, having the general formula (III)

wherein:
$R_5$ is a straght- or branched-chain alkyl radical containing from 1 to 20 carbon atoms, or a mono- or poly-alkyl-substituted phenyl radical; and
(c) the phosphonites and diphosphonites having the general formula and -continued (V)

wherein:
R_6, R_7 and R_8 represent, independently from one another, a straight- or branched-chain alkyl radical containing from 1 to 20 carbon atoms, or mono- or poly-alkyl-substituted phenyl radical.

11. A thermostabilized polyolefin obtained by the process of claim 1.

* * * * *